United States Patent
Albers

(10) Patent No.: US 8,462,320 B2
(45) Date of Patent: Jun. 11, 2013

(54) SENSOR APPARATUS COMPRISING A DISTANCE SENSOR

(75) Inventor: Bas Albers, Chur (CH)

(73) Assignee: Cedes AG, Landquart (CH)

( * ) Notice: Subject to any disclaimer, the term of this patent is extended or adjusted under 35 U.S.C. 154(b) by 0 days.

(21) Appl. No.: 13/111,261

(22) Filed: May 19, 2011

(65) Prior Publication Data
US 2011/0299060 A1    Dec. 8, 2011

Related U.S. Application Data

(63) Continuation of application No. PCT/EP2009/008241, filed on Nov. 19, 2009.

(30) Foreign Application Priority Data

Nov. 20, 2008 (EP) .................................. 08020219

(51) Int. Cl.
*G01C 3/08* (2006.01)

(52) U.S. Cl.
USPC .......................................... 356/5.01; 356/5.1

(58) Field of Classification Search
USPC ........................................................ 356/5.01
See application file for complete search history.

(56) References Cited

U.S. PATENT DOCUMENTS

| | | | | |
|---|---|---|---|---|
| 4,692,023 A * | 9/1987 | Ohtomo et al. | ............... | 356/5.11 |
| 5,327,514 A * | 7/1994 | Dujon et al. | ................... | 385/115 |
| 5,973,770 A | 10/1999 | Carter et al. | | |
| 7,440,084 B2 * | 10/2008 | Kane | ............................ | 356/5.01 |
| 2002/0097956 A1 | 7/2002 | Kikuchi et al. | | |
| 2006/0132752 A1 | 6/2006 | Kane | | |
| 2007/0058154 A1 * | 3/2007 | Reichert et al. | ............... | 356/5.01 |
| 2008/0094631 A1 * | 4/2008 | Jung et al. | ..................... | 356/419 |
| 2008/0225263 A1 * | 9/2008 | Albers et al. | ................. | 356/4.01 |
| 2009/0195770 A1 * | 8/2009 | Satzky et al. | ................. | 356/5.01 |
| 2010/0254570 A1 * | 10/2010 | De Coi et al. | ................. | 382/100 |

FOREIGN PATENT DOCUMENTS

DE   10 2005 040 763 A1   3/2007
EP         0 484 270 A2   5/1992

* cited by examiner

*Primary Examiner* — Luke Ratcliffe
(74) *Attorney, Agent, or Firm* — Burr & Brown

(57) ABSTRACT

A sensor apparatus comprising a distance sensor comprising a transmitting device having at least one transmitter with a light source, and a receiving device having at least one receiver, and an electronic unit. The electronic unit being designed to emit light by means of the transmitter and to determine a distance which is covered by light emitted by the transmitter from a reflection surface of an object in a monitored area to the respective receiver. According to the invention, light guide means for transmission of light are arranged between the transmitting device and the monitored area and/or between the monitored area and the receiving device. The light guide means reflects the light at least once so that light can pass from the transmitting device to the monitored area and/or from the monitored area to the receiving device on an angled path.

15 Claims, 2 Drawing Sheets

SENSOR APPARATUS COMPRISING A DISTANCE SENSOR

CROSS REFERENCE TO RELATED APPLICATIONS

This application is a continuation of International Application No. PCT/EP2009/008241 filed Nov. 18, 2009, which designated the United States, and claims the benefit under 35 USC §119(a)-(d) of European Application No. 08020219.5 filed Nov. 20, 2008, the entireties of which are incorporated herein by reference.

FIELD OF THE INVENTION

The invention relates to a sensor apparatus comprising sensor means and an electronic unit to detect the distances to various objects.

BACKGROUND OF THE INVENTION

It is necessary in many applications to detect the distances to various objects. If such objects are spatially separate, a distance sensor is required for each object.

SUMMARY OF THE INVENTION

It is the object of the present invention to improve distance measurement systems.

The invention proceeds from a sensor apparatus comprising a distance sensor which consists of a transmit device having at least one transmitter with a light source, and of a receive device having at least one receiver, and comprising an electronic unit, the electronic unit being designed to emit light by means of the transmitter and to determine a distance which is covered by light emitted by the transmitter from a reflection surface of an object in a monitored area to the respective receiver. The distance measurement can, for example, be performed by evaluating a flight time of the light and/or a phase of an oscillation modulated onto the light. Such sensors are also denoted as "Time of Flight" sensors (TOF sensors).

The core of the invention resides in the fact that light guide means for transmitting light are arranged between the transmit device and the monitored area and/or between the monitored area and the receive device, the light guide means reflecting the light at least once so that the light can pass from the transmit device to the monitored area and/or from the monitored area to the receive device on an angled path, in particular a multiply angled path such as, for example, in the case of a known light guide on the basis of an optical fiber. It is possible in the case of a fiber optic light guide also to talk of a curved path, particularly in terms of its outer shape. Fundamentally, a reflection can comprise a specular reflection and/or a reflection by total reflection. As regards a light guide based on fiber optics, there is a multiple total reflection of the light signal at the outer boundary surface of a glass fiber, for example upon bending of the glass fiber. However, it is also possible to apply one or more reflectors or prism elements in order to implement an angled, in particular multiply angled path of the light.

The procedure of leading light on an angled path is particularly advantageous whenever a plurality of separate areas are to be monitored, the receive device being unable, without light guide means, to see all the separate areas, and/or the transmit device being unable, without light guide means, to irradiate all the separate monitored areas with light. The light guide means can then be used both to return light and to irradiate an object with light from areas totally separated optically on a direct path.

Even when a comparatively large, in particular spatially subdivided, area is to be monitored, owing to this measure there is only a one-off requirement for expensive components of the sensor apparatus, such as, for example, a TOF chip, a power supply and/or a microcontroller, since the light can be transmitted via the light guide means from, for example, a central unit to the respective monitored location. Light reflected by the monitored location can pass back to the central unit via light guide means. As long as the light is "brought" to the respective monitored location via the light guide means, the intensity of the light that acts on an object is comparatively high. Equally, the light retroreflected by a monitored location is affected by few losses when it can pass back to a receive device via the light guide means. Scattering losses, which normally occur to a large extent, can normally be avoided thereby.

Fundamentally, the inventive procedure has the advantage that the distance sensor need not be situated at the location where measurements are to be executed. It is thereby possible also to monitor areas which are comparatively small and difficult to access. Such systems can be used in vending machines, for example. The number of products in separate storage slots can be detected by a distance measurement in such vending machines.

In order to obtain information relating to objects at a monitored location, the light retroreflected by the object, for example, a product in a vending machine, can be evaluated from the color. Light can be emitted at various frequencies, that is to say colors, by a transmit device in order to obtain a color information item relating to an object in the monitored area. For example, the object is irradiated with light of one color and the reflected light is detected in addition. The same occurs for another color. Depending on the retroreflected light intensity, the color to which the object is to be assigned can be deduced therefrom. A product can be identified in this way. It is also conceivable to irradiate the object with white light and to evaluate the reflected frequency bands at least partially in the receive device. The irradiation of the object with different colors simultaneously or sequentially need not take place in the visible region. It is also possible to use non-visible light.

The light guide means regularly transmit the light in the volume of the light guide. Glass fiber transmission means and/or glass fiber light guides can be used, for example.

In a particularly preferred refinement of the invention, the distance sensor comprises only one receiver and a plurality of transmitters, or only one transmitter and a plurality of receivers.

A cost-effective sensor apparatus can be constructed thereby. However, it is possible to monitor various monitored areas spaced apart from one another.

It is preferred, furthermore, to provide a control unit which enables independent control of transmitters and receivers.

An individual control can be used to provide a unique assignment between receiver and transmitter. When, for example, it is known which light source has emitted light, a unique assignment to the monitored object can be provided even when all the light guide means which transmit light to a receive device are led to only one receiver.

It is preferred, furthermore, when the light guide means are designed in such a way that one and the same light guide element transmits light from the transmit device into the monitored area and from the monitored area to the receive device. The outlay on the design of the light guide means can thereby be reduced.

A plurality of light guides are preferably combined in a bundle, for example to form a light guide element.

In a refinement of the invention furthermore preferred, the light guide means are arranged in such a way that, via a light guide element at the monitored location, light from the transmit device directly strikes a light guide element which transports light back to the receive device. It is also conceivable for light to be led indirectly to a light guide which transmits the light to the receive device, for example via a reflector. In a further advantageous refinement of the invention, light guide elements for transmitted and received light are led to a head part. This can be done both on the side of the distance sensor or on the side of the monitored area. The head part can comprise lenses or other optical elements. A desired alignment of transmitters and receivers can be ensured in this way.

The head part can also include electronic components. For example, an electronic shutter, an electronic polarizer and/or an electronic diverter (switcher) are provided. It is also conceivable to place a transmitter and/or receiver at least partially in a light guide head part. A head part can comprise an antireflection layer, a pofilter and/or a retardation layer.

It is thereby ensured that light is led reliably.

In an advantageous refinement of the invention which goes herebeyond, directing means are provided so that the alignment of transmitted and received light differs clearly in a head part, and/or can be set. Light guides cannot regularly be bent to a large extent. This means that in the case of a light guide which arrives in a head element in a direction which is not the preferred direction there is a need for a comparatively large amount of space in order to convert the direction of exiting light into the desired direction. Consequently, optical components can be provided in the head part in order to ensure that light enters or exits in the desired direction.

Optical units can be used to couple light into a light guide. Also conceivable is the use of such systems at a light exit location of a light guide, and/or on a path of the light from the exit location to a monitored object. Such optical elements can focus or expand light at least partially so that the light illuminates exactly the monitored area that is to be monitored.

Additional optical elements can, for example, be used to introduce more light into a light guide, thereby permitting a signal-to-noise ratio to be improved. The accuracy of a measurement can be increased by exactly irradiating only the surface that it is intended to monitor.

A transition of light guide means into a head element is preferably configured in such a way that the light does not encounter any optical break. To this end, the head part can, for example, be bonded or welded to the light guide means, or the head part is produced in one piece with the light guide means.

In this way, light from a transmitter can be more effectively coupled into the light guide means. Moreover, interfering reflections can be avoided when the light enters into or exits from the light guide means. The "optical efficiency" of the system is thereby improved.

Fundamentally, the light guide means can be configured so that they can be detached in the desired length in order then to be coupled to a sensor or a head part.

Customer-specific solutions can therefore be more easily implemented.

Moreover, it can be provided that coupling means are available for coupling light guide means to one another. A very large range of distance between a transmitter device and an area to be monitored can be covered by this measure.

If appropriate, it is possible to make a coupling only by plugging together or snapping on, and this further simplifies the entire process of coordinating the length of the light guide means.

In a further preferred refinement of the invention, the apparatus is designed to take measures when the light intensity of received light or the measured distance undershoots a prescribed threshold or overshoots a prescribed threshold.

It is preferred, in addition, when the prescribed threshold can be set and/or the apparatus itself undertakes to adapt a threshold value.

Such a refinement is particularly preferred whenever a customer can change the length of the light guide means as desired. If the length of a fiber optic light guide, for example, is changed, the measurement distance for the light also changes and so, too, does the damping behavior of the light. It should be possible for a threshold value to be adapted to these changed circumstances. The system is preferably itself capable of determining the length of the light guide means and/or the parameters dependent thereon. In a preferred refinement, the inventive apparatus generates a protocol for this purpose.

These measures render the use of the sensor apparatus more reliable and simpler.

In order to determine the length of the light guide, for example, various modulation frequencies or fundamental frequencies of the light are used.

The background to this is that a light guide behaves differently for different frequencies of the light, it being possible therefrom to determine the absolute length of the light guide.

Light guides of different configuration can be used. Monomode light guides and multimode light guides, for example. Monomode fibers are used in monomode light guides. There is only one possible light path for such fibers. Thus, for a given frequency, no flight time differences occur, and this is advantageous for fast data transfer and accurate distance measurement.

In multimode light guides, the light is reflected at different angles, and this can lead to flight time differences of individual light components. By making targeted use of modes of the light in comparison, it is possible to calculate the length of the light guide therefrom. Furthermore, it is preferred, when a light guide which guides light to the monitored area is coupled in the head part directly into a light guide for reflected light. The length of the light guide can be determined easily in this way.

If multimode light guides are applied, it is preferred to correct the measured distance with regard to the different paths to which the light can return inside the light guide. By way of example, a reference measurement can be carried out to this end in order to determine the effective length of the light guide that is seen by the sensor and/or the object surface. Such a reference measurement can be undertaken during the installation of such a system or during production. Multimode light guides are certainly more cost intensive, but render it easier to couple light into the light guide.

It is preferred to use optical fibers with a core diameter of <50 µm, in particular <20 µm, for example also <10 µm. Fewer modes thereby result in the light guide.

It is preferred furthermore, when the light guide has a variable refractive index over the cross section, in particular when the refractive index is smaller to the outside. This is of interest in particular, in conjunction with multimode light guides since this measure leads to a reduction in flight time differences between light that is not much reflected in the light guide and light that has been multiply reflected together with a correspondingly longer path. This is based on the principle that light has a higher speed in the medium that is optically less dense. If the refractive index is lower towards the outside, light runs through these regions more quickly and this particularly benefits the light that is multiply reflected on the outer region which thereby runs on a longer path.

It is preferred furthermore, when the light guide, in particular an optical fiber is optimized to the frequency to be used.

Flight time differences of various modes in the light guide can also be kept as small as possible in this way.

In a refinement of the invention which is additionally preferred, the end of a light guide is provided with microlenses.

The coupling of, for example, an optical fiber of a light guide to a sensor can be improved thereby. Fresnel lenses or gradient index microlenses, for example, can be applied as lenses.

It is preferred, moreover, when the light source has a comparatively small radiation angle. By way of example, Burrus diodes or diodes with a particularly small radiation angle are used. Likewise conceivable are lasers or vcsel, vcsel components.

Also possible is a bandwidth reduction by the use of appropriate filters, for example a bandpass filter.

LEDs are basically comparatively cost-effective as light source, but have a large emission cone, and this renders coupling into an optical fiber more difficult. By contrast, lasers are expensive but have parallel light which can easily be coupled into a light guide, in particular an optical fiber.

It is fundamentally possible to carry out reference measurements in order to correct errors caused by the light guide, for example, an optical fiber.

In principle, printed circuit boards can be fastened in optical sensors, for example, by soldering, in particular iron soldering or hot sealing, to name but two examples. Printed circuit boards can have integrated light guide means and/or optical layers.

By way of example, an inventive system can be used to monitor the presence or absence of persons, for example, in a bed. In this case, the inventive system turns out to be particularly advantageous when, for example, a plurality of beds are to be monitored with one sensor, or a plurality of fields are to be monitored in a bed via one sensor.

BRIEF DESCRIPTION OF THE DRAWINGS

A plurality of exemplary embodiments are illustrated in the drawings and explained in more detail with specification of further advantages.

DETAILED DESCRIPTION OF THE INVENTION

Figure 1:
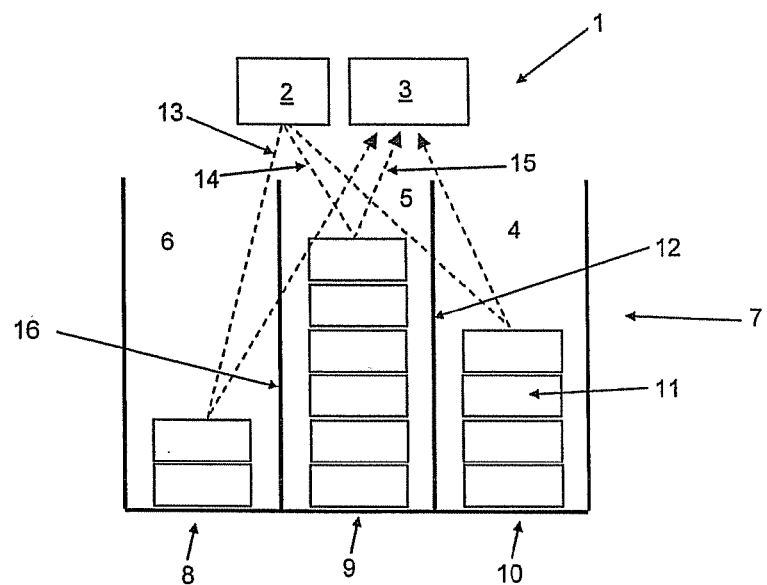
FIG. 1 shows, in a diagrammatic side view, a highly simplified part of a vending machine known from the prior art, in combination with a sensor apparatus.

FIG. 1 shows the case in which an attempt is made to use a distance sensor 1 consisting of a light source 2 and a receive device 3 to monitor three product storage slots 4, 5, 6 of a vending machine 7 which are separated from one another.

Stacks 8, 9, 10 of products 11 are arranged in the product storage slots 4, 5, 6. While it is true that the product storage slot 5, 6 can be reached with the aid of the light source 2 via light beams 13, 14, the product stack 10 cannot be reached owing to an intermediate wall 12 between the product storage slot 4 and 5. In addition, the receive device can detect only reflected light 15 from the product stack 9, whereas light from the product stack 8 cannot reach the receive device 3 owing to an intermediate wall 16 between the product storage slot 6 and the product storage slot 5. No light passes to the receive device 3 from the product stack 10, since the light from the light source 2 is blocked by the intermediate wall 12.

Figure 2:
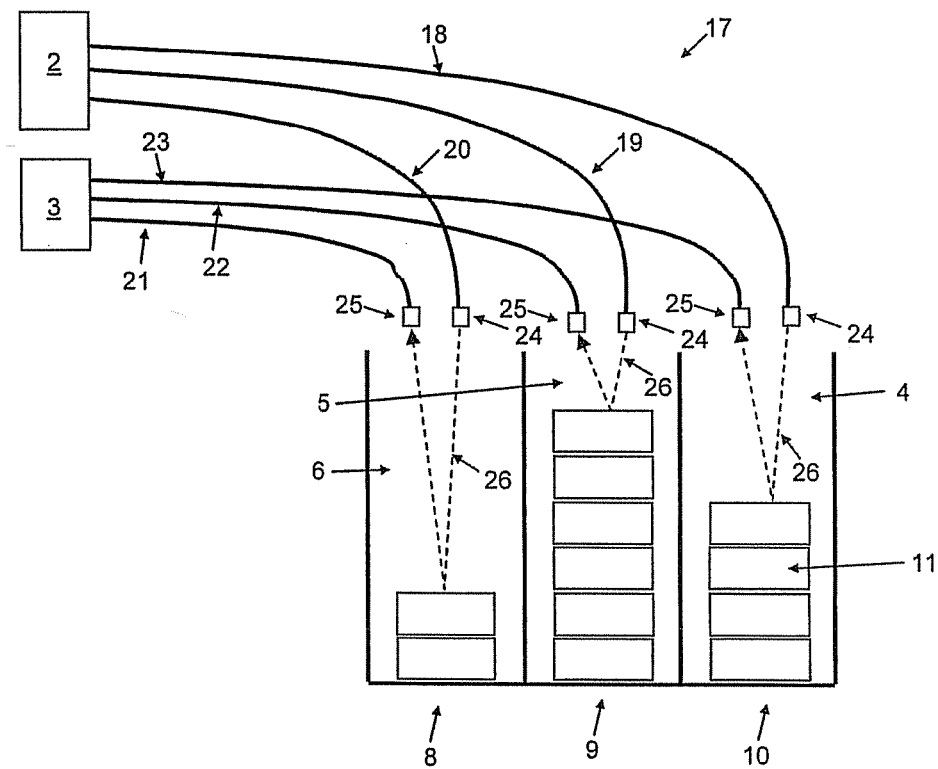
FIG. 2 shows the part already shown very diagrammatically in FIG. 1, of a vending machine with an inventive sensor apparatus.

As a result, only the distance to the product stack 9 can be determined. An inventive sensor apparatus 17 in accordance with FIG. 2 is used to be able to undertake a reliable measurement with regard to all the product stacks.

The sensor apparatus 17 likewise consists of a light source 2 and a receive device 3.

Light guides 18, 19, 20 are led from the light source 2 to each product stack slot 4, 5, 6, respectively, and light guides 21, 22, 23 are respectively led back to the receive device 3.

Consequently, the light is guided via the light guides 18, 19, 20 from the light source 2 to precisely such an area, namely the product storage slots 4, 5, 6, that are to be monitored. In the same way, a monitoring light beam which is retroreflected by a product stack 8, 9, 10 is picked up by the light guides 21, 22, 23 and led to the receive device 3.

In order to achieve a desired irradiation of a product stack 8, 9, 10 with the aid of the light source 2, the respective light guide 18, 19, 20 can be equipped with a light guide head 24. A light guide head 25 can likewise be provided in order to optimize introduction of reflected light 25 into the light guides 21, 22, 23 from the respective product stack 8, 9, 10.

The distance to the uppermost product 11 of a respective product stack 8, 9, 10 can be determined, for example, via the flight time of the light from the light source 2 to the receiver 3, or by evaluating a phase of an oscillation modulated onto the light coming from the light source 3.

In order to obtain conclusions relating to the respective height of a stack, and thus to the filling level of the respective product storage slot 4, 5, 6, it is necessary to take account of the different light guide lengths of the light guides 18 to 23.

Monitoring of spatially separated monitored areas in accordance with the product stack slots 4, 5, 6 can be implemented by the light guides 18 to 23 with the aid of only one receive device and only one light source.

Figure 3:
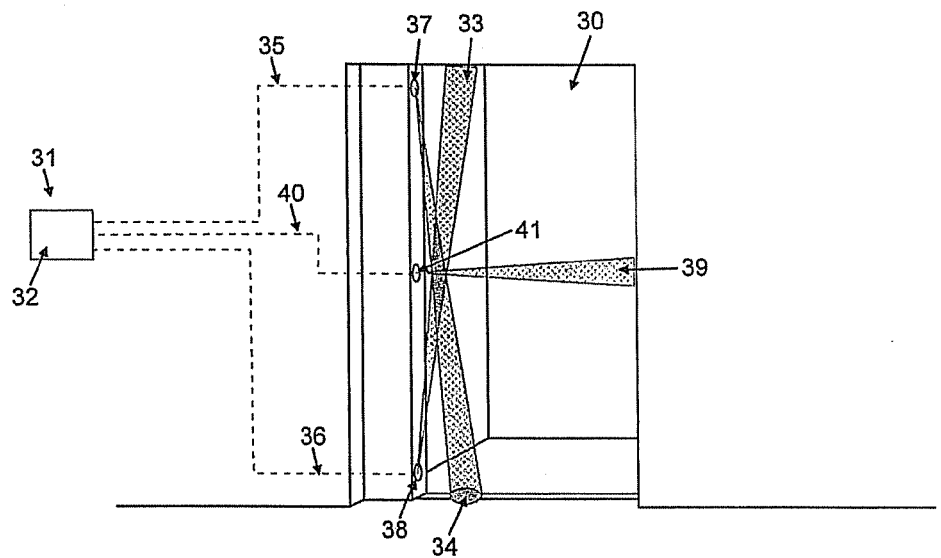
FIG. 3 shows in a diagrammatic illustration, an inventive sensor apparatus arranged in a lift.

FIG. 3 depicts a door opening 30 which is monitored by a sensor apparatus 31 that comprises a distance sensor 32. The door opening 30 is firstly monitored by 2 light beams 33, 34. The light beams come from the sensor device 31 by virtue of the fact that light is led via light guides 35, 36 to a light guide head 37, 38, respectively, the light beams 33, 34 then exiting therefrom in the desired direction. To this end, the respective light guide head comprises an additional optics, if appropriate. In addition, as illustrated in FIG. 3 a third light beam 39 can be used to monitor the distance between a door frame.

The light is preferably led via a light guide 40 to a light guide head 41 in a fashion coming from the distance sensor 32, and exits in the desired direction as light beam 39.

In order to distinguish between them, the two light beams 33, 34 or light cones 33, 34 can, for example, be operated in time-multiplex, or different modulation frequencies can be used.

When the front edge of a door approaches the monitored area in the door frame, said front edge would be detected as an object per se. In order to prevent this, the two light beams 33, 34 can be compared with one another. When both light beams measure the same distance, it is the door, otherwise an object, on the basis of which a security measure is, if appropriate, to be taken. This can consist in instituting immediate opening of the door.

Increased security in the monitoring of the door opening 30 can be achieved with the additional light beam 39 which, like the light beams 33, 34, is operated, if appropriate, in multiplex or with a different modulation frequency to the other light beams. As soon as a sudden change in distance is measured with the aid of the light beams and, moreover, the distance which the light beams 33, 34 measure is different, it is possible thereby to infer an object in the door opening 30. Thereafter, prescribed measures can be instituted—the immediate opening of the door, for example, as already mentioned above.

Figure 4:
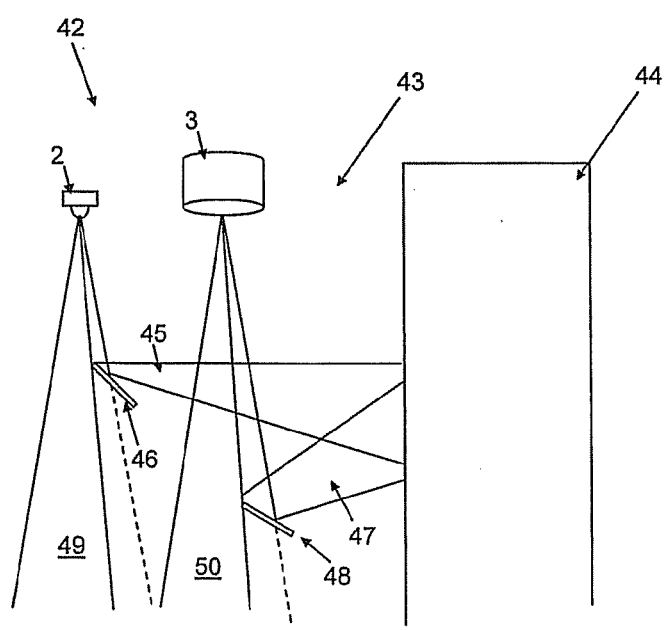
FIG. 4 shows a safety system for a door on the basis of an inventive sensor apparatus, illustrated diagrammatically.

FIG. 4 shows a sensor apparatus 42 which is provided for monitoring a door opening 43 with a door 44.

The door 44 is, for example, a sliding door which moves in a plane perpendicular to the plane of the drawing.

The sensor apparatus 42 has a light source 2 and a receive device 3. The light source shines straight down in an area 49. The sensor apparatus 3 likewise looks downward in an area 50 in order to monitor the door opening. A portion of the emitted light 45 on the light source 2 is deflected in the direction of the door 44 via a mirror element 46. If the light beam 45 strikes the door, the light beam is reflected as reflected light 47 to a mirror element 48 which reflects the light into the receive device 3.

Both a door opening, and the movement of the door associated therewith can be monitored in this way with the aid of one sensor.

Reflection at the mirror elements 46 and 48 can be performed by specular reflection and/or by total reflection.

LIST OF REFERENCE NUMERALS

1 Distance sensor
2 Light source
3 Receive device
4 Product storage slot
5 Product storage slot
6 Product storage slot
7 Vending machine
8 Stack
9 Stack
10 Stack
11 Product
12 Intermediate wall
13 Light beam
14 Light beam
15 Light
16 Intermediate wall
17 Sensor apparatus
18 Light guide
19 Light guide
20 Light guide
21 Light guide
22 Light guide
23 Light guide
24 Light guide head
25 Light guide head
26 Light
30 Door opening
31 Sensor apparatus
32 Distance sensor
33 Light beam
34 Light beam
35 Light guide
36 Light guide
37 Light guide head
38 Light guide head
39 Light beam
40 Light guide
41 Light head
42 Sensor apparatus
43 Door opening
44 Door
45 Emitted light
46 Mirror element
47 Reflected light
48 Mirror element
49 Area
50 Area

I claim:

1. A sensor apparatus comprising a distance sensor consisting of a transmit device having at least one transmitter with a light source, a receive device having at least one receiver, and an electronic unit that emits light by means of the transmitter and determines a distance which light emitted by the transmitter covers from a reflection surface of an object in a monitored area to the respective receiver on a basis of an evaluation of at least one of a running time of the light and a phase of an oscillation modulated onto the light, wherein a plurality of light guide means are arranged for transmitting light between a plurality of spatially separated, optically separate monitored areas and the receive device, wherein the light guide means reflect the light at least once so that light can pass from the monitored areas to the receive device on an angled path, and wherein an evaluation of the plurality of light guide means is performed with only one receive unit in the form of a time of flight sensor.

2. An apparatus according to claim 1, wherein a plurality of light guide means are arranged between the transmit device and the plurality of optically separate monitored areas for transmission of light, wherein the light guide means reflect the light at least once so that the light can pass from the transmit device to monitored areas on an angled path.

3. An apparatus according to claim 1, wherein the light guide means comprise a TIR (Total Internal Reflection) lens.

4. An apparatus according to claim 1, wherein a control unit is provided for the independent control of transmitters and receivers.

5. An apparatus according to claim 1, wherein the light guide means are designed in such a way that the same light guide element transmits light from the transmit device into the monitored area and from the monitored area to the receive device.

6. An apparatus according to claim 1, wherein a plurality of light guides are combined in a bundle.

7. An apparatus according to claim 1, wherein the light guide means are arranged in such a way that, via a light guide element at the monitored location, light from the transmit device directly strikes a light guide element which transports light back to the receive device.

8. An apparatus according to claim 1, wherein light guide elements for transmitted and received light are led to a head part.

9. An apparatus according to claim 8, wherein the head part comprises electronic components.

10. An apparatus according to claim 1, wherein directing means are provided so that the alignment of transmitted and received light differs clearly in a head part.

11. An apparatus according to claim 1, wherein the apparatus is designed to take measurements when the light intensity of received light and/or the measured distance undershoots a prescribed threshold or overshoots a prescribed threshold.

12. An apparatus according to claim 1, wherein the apparatus is capable of determining the length of light guide means automatically.

13. An apparatus according to claim 1, wherein the end of a light guide is provided with microlenses.

14. An apparatus according to claim 1, wherein the light source has a comparatively small radiation angle.

15. An apparatus according to claim 1, wherein means are provided in order to obtain a color information item relating to an object in the monitored area, on the basis of a comparison of radiated light of different frequency, and thus the color and/or the evaluation of light retroreflected by the object, with regard to different frequencies.

\* \* \* \* \*